Oct. 22, 1957    G. S. SAUNDERS    2,810,310
DOWELING JIGS
Filed Nov. 10, 1955    3 Sheets-Sheet 1
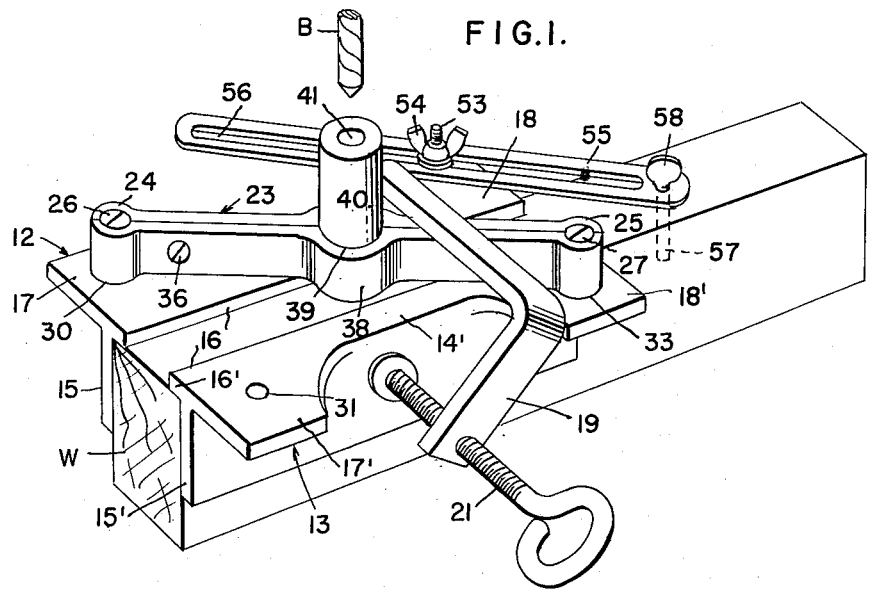
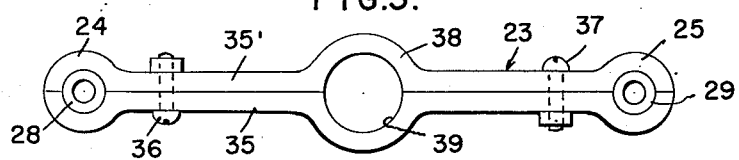
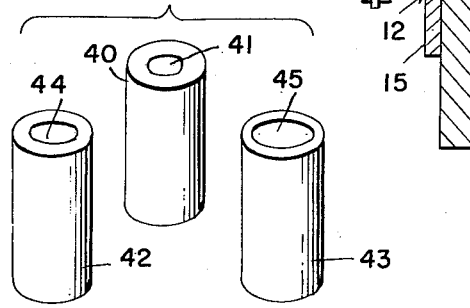
INVENTOR.
Gordon S. Saunders
BY
Arthur Middleton
ATTY.

Oct. 22, 1957     G. S. SAUNDERS     2,810,310
DOWELING JIGS
Filed Nov. 10, 1955     3 Sheets-Sheet 2
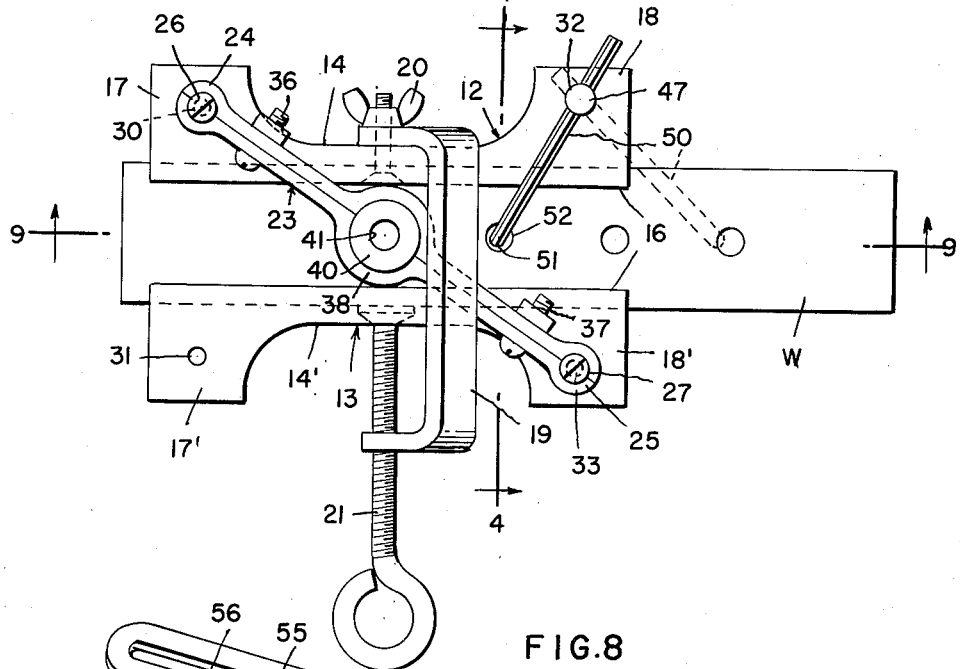
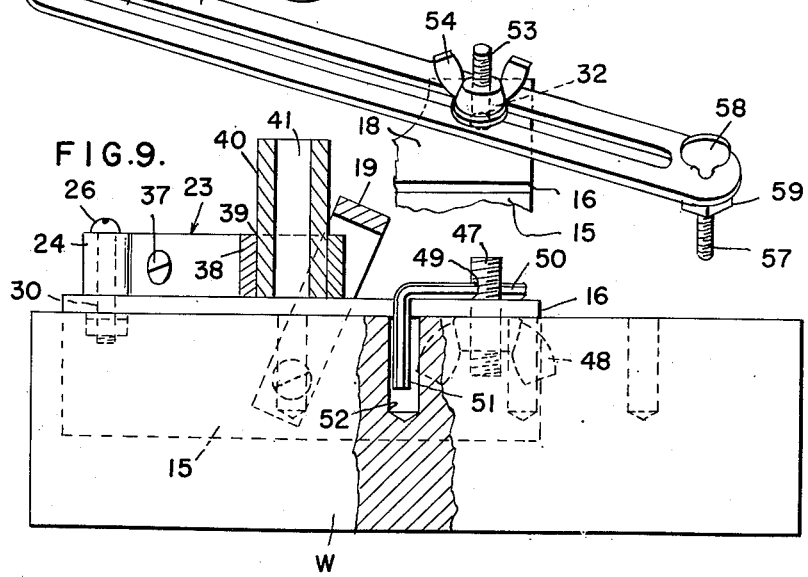
INVENTOR.
Gordon S. Saunders Oct. 22, 1957
G. S. SAUNDERS
2,810,310
DOWELING JIGS
Filed Nov. 10, 1955
3 Sheets-Sheet 3
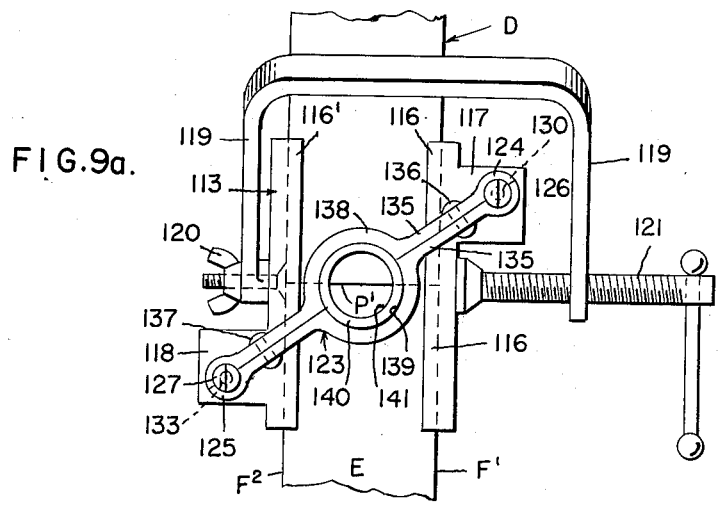
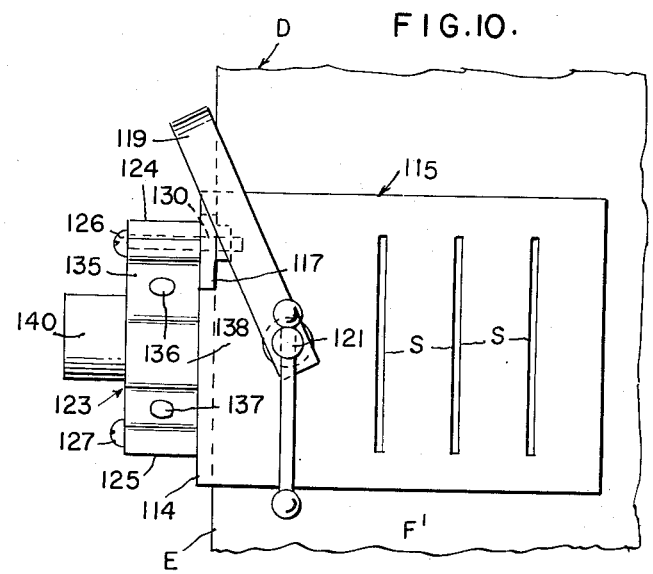
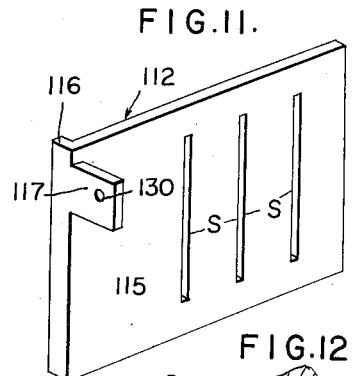
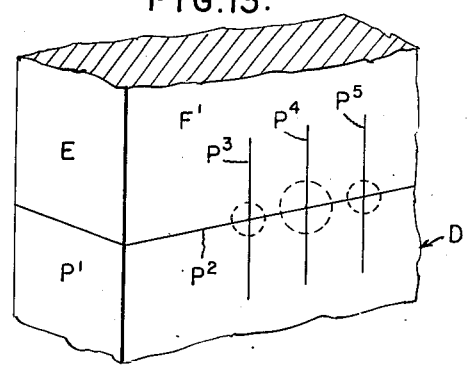
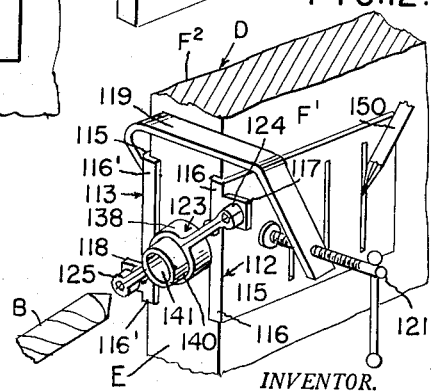
INVENTOR.
Gordon S. Saunders
BY
Arthur Middleton
ATTY.

United States Patent Office 2,810,310  
Patented Oct. 22, 1957

2,810,310

DOWELING JIGS

Gordon S. Saunders, Neshanic Station, N. J.

Application November 10, 1955, Serial No. 546,098

4 Claims. (Cl. 77—62)

This invention relates generally to the class of tools and is directed particularly to improvements in hole drilling jigs and while the invention is particularly applicable to wood-working it may be employed also with equal efficiency in working with metals, plastics or other materials.

In the fabrication of various structures of wood, metal or other materials, particularly in wood-working, in the making of articles of furniture, where the invention may find its greatest use, frames of various kinds such as window screen frames, picture frames or any other units where two or more pieces of material are to be joined together with opposing or abutting faces, use is frequently made of dowels for securing the pieces of work together, not only for the purpose of obtaining a strong joint but also where it may be desired to avoid, especially in wood working, the use of nails, screws or other securing elements which would be exposed on a face of the work and which would have to be counter-sunk and covered if they are not to be seen. The invention is also useful in drilling holes in doors for inserting locks therein.

Before the development of any type of jig for holding a drill bit in proper position for drilling the hole, it was necessary for the carpenter or cabinet maker to very carefully lay off center lines and drill centers for forming the holes in which the dowels were to be fixed and extreme difficulty was encountered in getting the dowel holes in one piece of work exactly positioned to match the holes in the opposite piece of work so that when the dowels were inserted in one set of holes in one work piece, they would enter accurately into the holes of the other piece. Not only was it difficult to get the dowel holes spaced exactly the same in the two adjoining pieces but it was also difficult to make the holes coincide so that the side faces of the pieces of work would match up or fall in the same place.

The perfection of certain types of doweling jigs made possible the accurate centering of a drill bit with respect to the face of a piece of work and also made it possible to hold the drill bit exactly perpendicular or in any other desired relation to the face of the work in which the hole is to be made. However, while such doweling jigs made it easier to accurately position the holes, certain preliminary measurements still have to be made such as determining the width of the face in which the hole is to be drilled and then setting the doweling jigs in accordance with such measurements so that the drilled hole would be centrally located between opposite sides of such face. Furthermore, such jigs do not assist in locating the hole centers exactly the same distance apart in the two pieces of work but the pieces of work must be marked off to designate the positions of the hole centers and the jig is then set with an index mark coinciding with the markings on the work.

In the light of the foregoing, it is an object of the present invention to provide a new and novel hole drilling jig which substantially eliminates the necessity of making any preliminary measurements or calculations for locating a drill bit at a central position between two sides of the face of a work piece.

Another object of the invention is to provide such a jig that is constructed as a unitary tool, that is, it does not have a number of separable parts which must be assembled in a predetermined order to facilitate the use of the tool.

As stated, jigs are known which clamp to the work piece and have a guide for the drill bit. However, to use such jigs preliminary calculations must be made such as first determining the width of the face in which the hole is to be drilled and then making certain settings of parts of the jig in accordance with the size of the drill bit selected so that the hole when drilled will be in the exact center of the work.

It is, accordingly, another object of the invention to provide a jig so constructed and arranged that when it is clamped to the work by a clamping member or jaws forming a part of the jig structure, the drill bit guide means and bit engaged therein will be automatically centered between the sides of the work and held perpendicular to the face in which the hole is to be drilled.

As has also been previously set forth, doweling jigs of known construction require that the user make preliminary calculations and markings designating the centers between the dowel holes and the jig is then set on each piece of work with an index mark coinciding with the hole center marking made on the work.

It is accordingly another object of the present invention to provide a doweling jig wherein, after the formation of the first dowel hole, successive holes may be made in each of the work pieces at exactly the same center spacing without having to lay off the spacings on the work.

Still another object of the invention is to provide an improved jig having coacting work-engaging jaws which are designed to cause a minimum of interference with the setting of the piece of work with the jig attached thereto into a bench clamp or vise.

A yet further object is to devise an improved jig for use in drilling a hole in the edge of a door through which the bolt of a lock may go while at the same time providing marking means for centers on which holes can be drilled on and its extending handles in place.

The foregoing and possibly other objects are realized through the provision of a jig body in the form of a pair of elongated jaw-like members adapted to have the work piece clamped between them by means of a C-clamp. The work-clamping jaw members of the jig have marginal flanges extending toward each other for forming a seat to receive the upper edge of the work piece whereby the plane thereof is assuredly parallel to the plane of the upper edge of the jaw members. A flanged or wing-like lateral extension is provided at the end portions of the jaw members, and bridging diagonally opposite lateral extensions is a bar pivoted at its extremities respectively, to one of those extensions. Midway of the length of the bar is an aperture transversely therethrough in which is adapted to be removably seated a cylindrical ferrule or bushing with a bore therethrough for holding and centering a drill bit of a certain size, which ferrule can be readily replaced by another whose bore is sized for a different diameter drill bit. On one of the other flanged extensions is pivotally mounted and adjustably securable an upstanding bolt from which adjustably extends laterally of the bolt, an L-shaped hole locator and positioning member adapted to enter a dowel-hole already made in the work piece for holding the work piece in a fixed longitudinal relation to the jig body for thus determining the distance from a dowell-hole already made that the next dowel-hole to be made will be made. Another feature of the invention is that the bridging bar is made in two similar extruded aluminum parts that can be secured together to form the complete bar. Another feature is the drill-bit guiding ferrule or bushing that is or can be frictionally held in place in the bridging bar. A slight modification of the foregoing, characterized by omitting the hole-locator but elongating downwardly the main body of each jaw member and providing it with marking slots, permits the jig to be used for making drill holes for locks in doors.

The invention is illustrated in the accompanying drawings in which Figure 1 is an isometric view of my doweling jig in working position. Fig. 2 shows a plan view of one section of the bridging bar 23, while Fig. 3 is a similar view but of the complete bar. Fig. 4 is a view taken along the line 4—4 of Fig. 7. Fig. 5 shows a detail. Fig. 6 shows several bushings 40 with different sized bores. Fig. 7 is a plan view of the jig in place on a work piece. Fig. 8 is an isometric view of the locator and postioning element of Fig. 1. Fig. 9 is a vertical sectional view, with parts in section, taken along the line 9—9 in Fig. 7. Fig. 9a is a front elevational view of a slightly modified device on the front edge of a door. Fig. 10 is a side elevational view of the arrangement of Fig. 9a. Fig. 11 is an isometric view of a side plate 115 of the device shown in Figs. 9 and 10. Fig. 12 is an isometric view of the device of Figs. 9 and 10 plus a pencil marking in slots S, while Fig. 13 is a fragmentary view of a door showing how it is marked for drilling.

In the drawings, the body of the doweling jig is made up of a pair of oppositely directed jaws or jaw members 12 and 13, substantially L-shaped in cross-section, each having respectively a horizontal member 14 and 14'; a depending work-piece-gripping plate 15 and 15'; work-piece-seating flanges 16 and 16' for maintaining the plane of the top of the work piece parallel to the plane of the horizontal members 14 and 14'; and two wing-like lateral extensions 17 and 17' at the one end portion of the horizontal members, with another pair 18 and 18' at the other end portion.

W represents the work piece in which the dowel holes are to be made when clamped between the jaw members 12 and 13. The jaw members are clampable together in work-gripping position on work pieces of various widths by the C-clamp 19 removably secured by wing-nut 20 to jaw member 12, and at its other end has an adjusting screw 21 for effecting appropriate clamping pressure.

The jaw members 12 and 13 are held in position to move toward and away from each other by the bridging bar 23 whose cylindrically-shaped terminal ends 24 and 25 are pivotally held by bolts 26 and 27 respectively passing through bushings 28 and 29 respectively. 30, 31, 32 and 33 represent apertures in the wing-like extensions on the jaw members.

The bridging bar 23 is made up of two oppositely directed extruded aluminum sections 35 and 35' of the shape shown in Fig. 2 (that are extruded in lengths and cut to the proper width), that can be put together as shown in Fig. 3, and there fastened by bolts 36 and 37, or otherwise such as by rivets to form the composite bar 23, that provides a central hub 38 having a bore 39 into which can be inserted to be removably held there frictionally, a ferrule or bushing 40 having a bore 41 for guiding and centering a drill bit B. Alternate ferrules or bushings 42 and 43 can be used (Fig. 6) having bores 44 and 45 respectively of different diameter. Bore 41 of bushing 40, for instance, is one-fourth inch in diameter; bore 44 of bushing 42 is of three-eighths inch diameter; and bore 45 of bushing 43 is of one-half inch diameter— for the purpose of accommodating the desired size of drill bit. The outside diameter of these bushings is five-eighths inch plus say .002 inch allowance for variation in the bore 19 of the hub 38 of the bridging bar 23.

Now we come to an important accessory, namely a dowel hole locator and positioning device shown in two possible forms: one form in Figs. 4, 7 and 9; and another form in Figs. 1 and 8. Referring first to the form of Figs. 4, 7 and 9, a bolt 47 extends upwardly through aperture 32 in wing extension 18 of jaw member 12, provided therebeneath with a wing nut 48, while passing through an aperture 49 transversely of the nut 47, is an L-shaped locator pin 50 having an L-shaped extension or leg 51, adapted to enter a dowel hole 52 already made. The pin 50 is held in aperture 49 of bolt 47, so it can be extended from or retracted to that bolt and when in the desired position, it can be secured thereby means of the wing nut 48 clamping it against the wing extension 18 (Fig. 4). Prior to such clamping, the nut can be swung rotationally to swing the pin 50 to any angle desired. In the other form, of Figs. 1 and 8, a bolt 53 is used having a wing nut 54 that clamps to the wing extension in any desired position a strap 55 longitudinally slotted as at 56 that carries at one of its terminals a pin 57 with a winged head 58, and is held in adjusted pendant position by nut 59. So in this modification, we have an L-shaped locator and dowel positioner with a horizontal body 55 and an L-like extension 57, all adjustably held both for horizontal sliding movement and for vertical adjustment into and out of a dowel hole.

In Figs. 9 and 13, the door to be drilled is indicated by the letter D while its edge is indicated by E and its two faces by $F^1$ and $F^2$. The door is first marked with a pencil along its edge E as at $P^1$, and then the mark is continued around on the door face $F^1$, as shown by marking $P^2$. A similar marking is also put on the other face $F^2$ of the door if desired. In Fig. 1 the jig for drilling a vertical hole is applied horizontally onto the work-piece that extends horizontally, but in the case of applying the jig for drilling a horizontal hole to a door, which extends vertically, is applied to the door vertically, as shown in Fig. 10. The jaw members 112 and 113 have work-gripping flanges 116 and 116' respectively and also plates 115 and 115' at right angles to the flanges. The plates have a wing-like extension 117 and 118 respectively. The jaw members 112 and 113 are clampable together with the edge of the door between them by the C-clamp 119 removably secured by wing-nut 120 to jaw member 113, and at its other end has an adjusting screw 121 for effecting appropriate clamping pressure.

The jaw members 112 and 113 are held in position to move toward and away from each other by the bridging bar 123 whose cylindrically-shaped terminal ends 124 and 125 are pivotally held by bolts 126 and 127 respectively, which may or may not pass through bushings 28 and 29 as shown in Fig. 5. 130 and 133 represent apertures in the wing-like extensions 117 and 118 respectively, on the jaw members. The bridging bar 123 is made up of two oppositely directed extruded aluminum sections 135 and 135' of the shape shown in Fig. 2, that can be put together and as shown in Fig. 3, and there fastened by bolts 136 and 137, or otherwise as by rivets, to form the composite bar 123, that provides a central hub 138 having a bore 139 into which can be inserted a ferrule or bushing 140 having a bore 141 for guiding and centering drill bit B.

In Fig. 1, the work-gripping side plates 15 and 15' are shown as rather short, whereas in the modification of Figs. 9 to 12, their related parts 115 and 115' are much longer as shown in Figs. 10, 11 and 12 and are provided with parallel slots S that are also parallel to the flanges 116 and 116'.

In operation, the C-clamp adjusting screw 21 is unscrewed to permit the jaw members 12 and 13 to be fitted straddlingly over the width of the work piece W as shown in the drawings, until the top edge of the work piece seats itself between the inwardly-extending flanges 16 and 16' for assuring that the plane of the top edge of the work piece is parallel to the plane of the top of the jaw members and especially the wing extensions 17 and 17'. Thereupon the adjusting screw 21 of the C-clamp 19 is screwed up to hold the doweling jig firmly in place on the work piece. Due to the parallel position of the jaw members abutting the sides of the work piece, and the construction of the bridging bar 23, the hub 38 thereof is centered over the work piece, so that with the ferrule or bushing 40 emplaced therein vertically, the bore 41 of the bushing will guide and hold the drill bit B placed therein centered exactly over the work piece, so that the dowel hole made by the bit will be in the correct place and at the correct angle, without any measuring being required on the part of the operator. Depending upon what size hole is to be drilled, the operator uses the appropriate bushing 40, or 42, or 43, since these bushings are removably held in place in the bore 39 of the hub 38 of the bridging bar, merely by friction. But it is to be noted that these bushings are more than twice as high as the hub is, in order to guide the drill bit accurately against any undue misalignment with respect to that work piece.

Assuming that the dowel hole has now been drilled, the adjusting screw 21 of the C-clamp is unscrewed, and the jaw members loosened with respect to the work piece, and the work piece moved to the right for positioning it for the next dowel hole to be drilled, and the C-clamp retightened to hold the parts in place. Usually a series of dowel holes are to be drilled, and it is important that they be spaced apart a uniform predetermined distance. So in order to do that readily without undue measuring by the operator, the locator and positioning device comes into play. There are two types of this device, one shown in Figs. 4, 7 and 9, and one shown in Figs. 1 and 8. Referring first to the former, let us assume that the dowel holes are to be drilled one inch from center to center. The work piece is moved so that the first dowel hole already drilled (52 in Figs. 7 and 9) therein is located exactly one inch from the center of the bore 41 of the bushing 40, whereupon the wing nut 48 is loosened on the bolt 47 to free the pin 50 in its aperture 49 to permit its L-shaped extension or leg 51 to be entered into the hole 52 as shown in Fig. 9 and then the wing nut 48 is tightened. The leg 51 then becomes the yardstick for entering subsequently made dowel holes for assuring that the holes are equidistantly spaced without further measuring. Referring now to the other form of locator and positioning device, shown in Figs. 1 and 8, the strap 55 is slid along with its slot 56 under the loosened wing nut 54, and it is angled properly until its terminal dependent pin 57 enters the already drilled hole 52, whereupon the wing nut 54 is tightened on its bolt 53 to hold the locator and positioner device in proper place, for thus holding and positioning the work piece in the jaw members ready for the correct drilling of the next dowel hole.

Whereas the jig illustrated in Figs. 1, 7 and 8 is devised for locating dowel holes, the jig illustrated in Figs. 9, 10 and 13 is devised for centering holes to be drilled in a door into which is to be inserted a lock of the Schlage type. With that type of lock, a large hole has to be drilled in the edge of the door, while a plurality of holes have to be drilled in the face of the door. So the jig of these latter figures is for first locating and drilling the hole in the edge of the door, whereupon pencil markings are made through the slots S in the pendant or side plates 115 and 115' showing where the holes in the face of the door should be drilled. Looking at Fig. 13, the edge of the door is marked with a pencil mark P¹ at an elevation along which line the drill hole should be centered for insertion of the bolt of the lock. At the same time, by the use of a T-square, that line is extended around onto the face F¹ of the door as shown by the mark P² that establishes a line at an elevation along which are to be centered the drill holes in the face of the door for face-contacting parts of the lock. Thereafter, the jig of Figs. 9, 10 and 12, is applied to the front edge E of the door as shown in these views. The bore 141 of the bushing 140 is held in front of the edge E of the door with the jaws of the jig on each side of the door while the unclamped jig is moved about with the center of the bore of the bushing on the transverse pencil line P¹ (as shown in Fig. 9), whereupon the C-clamp 119 is tightened to clamp the door between the jaw members 112 and 113 that are held together by the bridging bar 123. This centers the bore 141 of the bushing 140 on the horizontal line and precisely in the vertical center line of the edge E of the door. In other words, the bore is centered on the horizontal pencil line P¹ by hand, and then it is centered vertically on that line, by operation of the clamp 119 clamping the jaw members 112 and 113. The operator then only needs to enter the drill bit B in the bore 141 of the bushing and drill the desired hole, whereupon the drill bit is removed. The operator next marks with a pencil 150 through the slots S in the sideplate 115 on the jaw member 112 for thus making pencil marks equivalent to markings P³, P⁴ and P⁵ (Fig. 13). Where these markings cross the horizontal pencil mark P², is where the operator should drill the other holes required by the lock, as shown in dotted lines in Fig. 13. The clamping screw 121 is next loosened and the C-clamp removed from the door, while along with it goes the bridging bar 123, and its jaw members 112 and 113.

So we have here a jig for locating the drill hole for the insertion of a door lock, while also providing means for directly locating the position of holes to be drilled in the face of the door. The device is unusually simple in construction, and rather cheap to make, yet it is surprisingly accurate.

It is to be noted that the jig is self-contained and its only separable parts are the replaceable bushings or ferrules, for the C-clamp is made fast to the jaw member by the wing nut. The wing-like extensions may be made in cuspate form, as shown to be more attractive in design and also self-reinforcing. The bridging bars are important both as to their design and ease of extruding manufacture, and also as to their function of spacing the jaw members and holding them so they can be moved toward and away from each other by the C-clamp while accommodating themselves to a wide range of thickness (or width) of the work pieces to be drilled with holes. With the increase in do-it-yourself work done in home shops, this simple, cheap and effective doweling jig meets a real demand.

As this invention may be embodied in several forms without departing from the spirit or essential characteristics thereof, the present embodiment is therefore illustrative and not restrictive, since the scope of the invention is defined in the appended claims rather than by the description preceding them, and all changes that fall within the metes and bounds of the claims or that form their functional equivalents are therefore intended to be embraced by those claims.

I claim:

1. A jig including a pair of coacting jaw members for gripping a work piece therebetween, each jaw member comprising an elongate plate portion to fit against a side face of the work piece, a flange portion extending at a right angle outwardly from the top edge of the plate portion at one end portion thereof, the outwardly extending end flange portions being located diagonally opposite each other at opposite ends of the respective plate portions, and a flange extending inwardly at a right angle from the top edge of each plate portion to serve as a seat for the work piece for maintaining the plane of an edge face of the work piece parallel to the plane of the top edge of the plate portion, the inwardly extending flanges being relatively narrow to leave the main central part of said edge face of the work piece between the side plate portions exposed, means coupling the jaw members together for movement toward and from each other comprising a bridging bar pivotally mounted at its ends on the diagonally oppositely disposed outwardly extending flange portions of the jaw members and having a vertical bore centrally of its ends, a bushing secured in said bore for receiving a drill bit to guide the same toward the work piece, and a clamping device for clamping the jaw members together against the work piece, said clamping device bridging said bridging bar and jaw members and operatively engaging the plate portions at the outer side thereof below their upper edges substantially centrally of the ends of the same.

2. A jig including a pair of coacting jaw members for gripping a work piece therebetween, each jaw member comprising an elongate plate portion to fit against a side face of the work piece, and a flange extending inwardly at a right angle from the top edge thereof to serve as a seat for the work piece for maintaining the plane of an edge face of the work piece parallel to the plane of the top edge of the plate portion, the inwardly extending flanges being relatively narrow to leave the main central part of said edge face of the work piece between the plate portions exposed, one of the jaw members having a flange portion extending at a right angle from the top edge of its plate portion at one end thereof disposed diagonally opposite one of said outwardly extending end flange portions of the other jaw member, means coupling the jaw members together for movement toward and from each other comprising a bridging bar pivotally mounted at its ends on the diagonally oppositely disposed outwardly extending end flange portions of the jaw members and having a vertical bore centrally of its ends, a bushing secured in said bore for receiving a drill bit to guide the same toward the work piece, a clamping device for clamping the jaw members together against the work piece, said clamping device bridging said bridging bar and jaw members and operatively engaging the plate portions at the outer side thereof below their upper edges substantially centrally of the ends of the same, a bolt upstanding from the other one of the outwardly extending end flange portions of one of the jaw members, said bolt being angularly adjustable about a vertical axis, an L-shaped hole locator and positioning member, said member having its longer leg disposed transversely of and slidably engaging said bolt for lengthwise adjustment relative thereto, and with its shorter leg extending vertically downwardly to enter a hole already made in the work piece to locate the drill bit supported in said bushing of the bridging bar a predetermined distance from a previously drilled hole in the work piece.

3. A jig including a pair of coacting jaw members for gripping a work piece therebetween, each jaw member comprising an elongate plate portion to fit against a side face of the work piece, and a flange extending inwardly at a right angle from the top edge thereof to serve as a seat for the work piece for maintaining the plane of an edge face of the work piece parallel to the plane of the top edge of the plate portion, the inwardly extending flanges being relatively narrow to leave the main central part of said edge face of the work piece between the plate portions exposed, one of the jaw members having a flange portion extending at a right angle from the top edge of its plate portion at one end thereof disposed diagonally opposite one of said outwardly extending end flange portions of the other jaw member, means coupling the jaw members together for movement toward and from each other comprising a bridging bar pivotally mounted at its ends on the diagonally oppositely disposed outwardly extending end flange portions of the jaw members and having a vertical bore centrally of its ends, a bushing secured in said bore for receiving a drill bit to guide the same toward the work piece, a clamping device for clamping the jaw members together against the work piece, said clamping device bridging said bridging bar and jaw members and operatively engaging the plate portions at the outer side thereof below their upper edges substantially centrally of the ends of the same, a bolt upstanding from the other one of said outwardly extending end flange portions of one of the jaw members, said bolt being angularly adjustable about a vertical axis and having in its upper part a transverse aperture, and an L-shaped hole locator and positioning member having its longer leg engaging the bolt aperture for bodily longitudinal adjustment relative to the bolt, and with its shorter leg extending vertically downwardly to enter a hole already made in the work piece to locate the hole to be drilled a predetermined distance from an already drilled hole in the work piece.

4. A jig including a pair of coacting jaw members for gripping a work piece therebetween, each jaw member comprising an elongate plate portion to fit against a side face of the work piece, a flange portion extending at a right angle outwardly from the top edge of the plate portion at one end portion thereof, the outwardly extending end flange portions being located diagonally opposite each other at opposite ends of the respective plate portions, and a flange extending inwardly at a right angle from the top edge of each plate portion to serve as a seat for the work piece for maintaining the plane of an edge face of the work piece parallel to the plane of the top edge of the plate portion, the inwardly extending flanges being relatively narrow to leave the main central part of said edge face of the work piece between the side plate portions exposed, means coupling the jaw members together for movement toward and from each other comprising a bridging bar pivotally mounted at its ends on the diagonally oppositely disposed outwardly extending flange portions of the jaw members and having a vertical bore centrally of its ends, a bushing secured in said bore for receiving a drill bit to guide the same toward the work piece, and a clamping device for clamping the jaw members together against the work piece, said clamping device comprising a generally U-shaped clamping member bridging said bridging bar and the jaw members, the clamping member being removably connected at one end to one of said jaws at the outer side of its plate portion below the upper edge of the same substantially centrally of its ends, and an adjusting screw adjustably mounted in the other end portion of the U-shaped clamping member and at its inner end engaging the other jaw member at the outer side thereof below its top edge substantially centrally of the ends of the same.

References Cited in the file of this patent

UNITED STATES PATENTS

| | | |
|---|---|---|
| 2,674,906 | Timpner | Apr. 13, 1954 |
| 2,679,174 | Schlage | May 25, 1954 |
| 2,710,454 | Kershaw | June 14, 1955 |